(12) United States Patent
Fleming

(10) Patent No.: US 9,014,175 B2
(45) Date of Patent: Apr. 21, 2015

(54) ROUTING OF VOICE INTERNET PROTOCOL PACKETS TO A SELECTED PROCESSOR

(75) Inventor: Bruce Fleming, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 2314 days.

(21) Appl. No.: 11/618,345

(22) Filed: Dec. 29, 2006

(65) Prior Publication Data

US 2008/0159264 A1    Jul. 3, 2008

(51) Int. Cl.
| | |
|---|---|
| H04L 12/66 | (2006.01) |
| H04L 12/28 | (2006.01) |
| H04L 12/56 | (2006.01) |
| H04L 12/54 | (2013.01) |
| H04J 3/16 | (2006.01) |
| H04J 3/22 | (2006.01) |
| H04J 3/06 | (2006.01) |

(52) U.S. Cl.
CPC ..................................... H04L 12/66 (2013.01)

(58) Field of Classification Search
USPC .................. 370/352, 254, 428, 412, 503, 465
See application file for complete search history.

(56) References Cited

U.S. PATENT DOCUMENTS

| | | | | |
|---|---|---|---|---|
| 2001/0030958 A1* | 10/2001 | Kichise | ........................ | 370/352 |
| 2004/0109414 A1* | 6/2004 | Choi et al. | ..................... | 370/230 |
| 2005/0058149 A1* | 3/2005 | Howe | ............................. | 370/428 |
| 2005/0268324 A1* | 12/2005 | An | ................................ | 725/152 |
| 2006/0140221 A1* | 6/2006 | Yamada et al. | ................ | 370/503 |
| 2006/0268738 A1* | 11/2006 | Goerke et al. | ................ | 370/254 |
| 2007/0041524 A1* | 2/2007 | Webster et al. | ............ | 379/88.17 |

* cited by examiner

Primary Examiner — Melanie Jagannathan
Assistant Examiner — Stephanie Chang
(74) Attorney, Agent, or Firm — Schwabe, Williamson & Wyatt, P.C.

(57) ABSTRACT

Methods and apparatuses for routing voice Internet Protocol (IP) packet to a selected processor are described herein. The methods may include initially receiving at a digital baseband receiver of a device a plurality of IP packets. After receiving the IP packets, the digital baseband receiver may determine whether the IP packets are voice or non-voice IP packets. If the IP packets are determined to be non-voice IP packets, the digital baseband receiver may route the non-voice IP packets to a first processor for processing. On the other hand, if the IP packets are determined to be voice IP packets, the digital baseband receiver may route the voice IP packets to a second processor for processing.

17 Claims, 3 Drawing Sheets

ROUTING OF VOICE INTERNET PROTOCOL PACKETS TO A SELECTED PROCESSOR

TECHNICAL FIELD

Embodiments of the present invention relate to the field of signal processing, more specifically, to processing of Voice over Internet Protocol (IP) packets.

BACKGROUND

Voice over Internet Protocol (VoIP) telephony or simply "VoIP" is an alternative way of making telephone calls that is becoming increasingly popular. In VoIP, voice conversations are routed over the Internet or through any other IP-based network, the IP-based network being a wired and/or a wireless network. When telephone calls are made via VoIP, audio or voice signals are typically encapsulated into IP packets (herein "voice IP packets") and transmitted over the IP-based network. End users (i.e., caller or callee) will generally only need a computing device such as a laptop or desktop computer running a VoIP application to communicate via VoIP. By employing VoIP, only a single network may be needed in order to carry both voice and data signals.

There are, however, certain drawbacks associated with using VoIP. For example, the amount of processing and power required to process voice IP packets at the end user's computing device may be prohibitive particularly when an application processor of the computing device is employed in order to process voice IP packets. That is, the usage of the end user's device may be compromised during a call session because of the processing burden placed on the device processor which may result in the duty cycle being increased resulting in greater power consumption.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
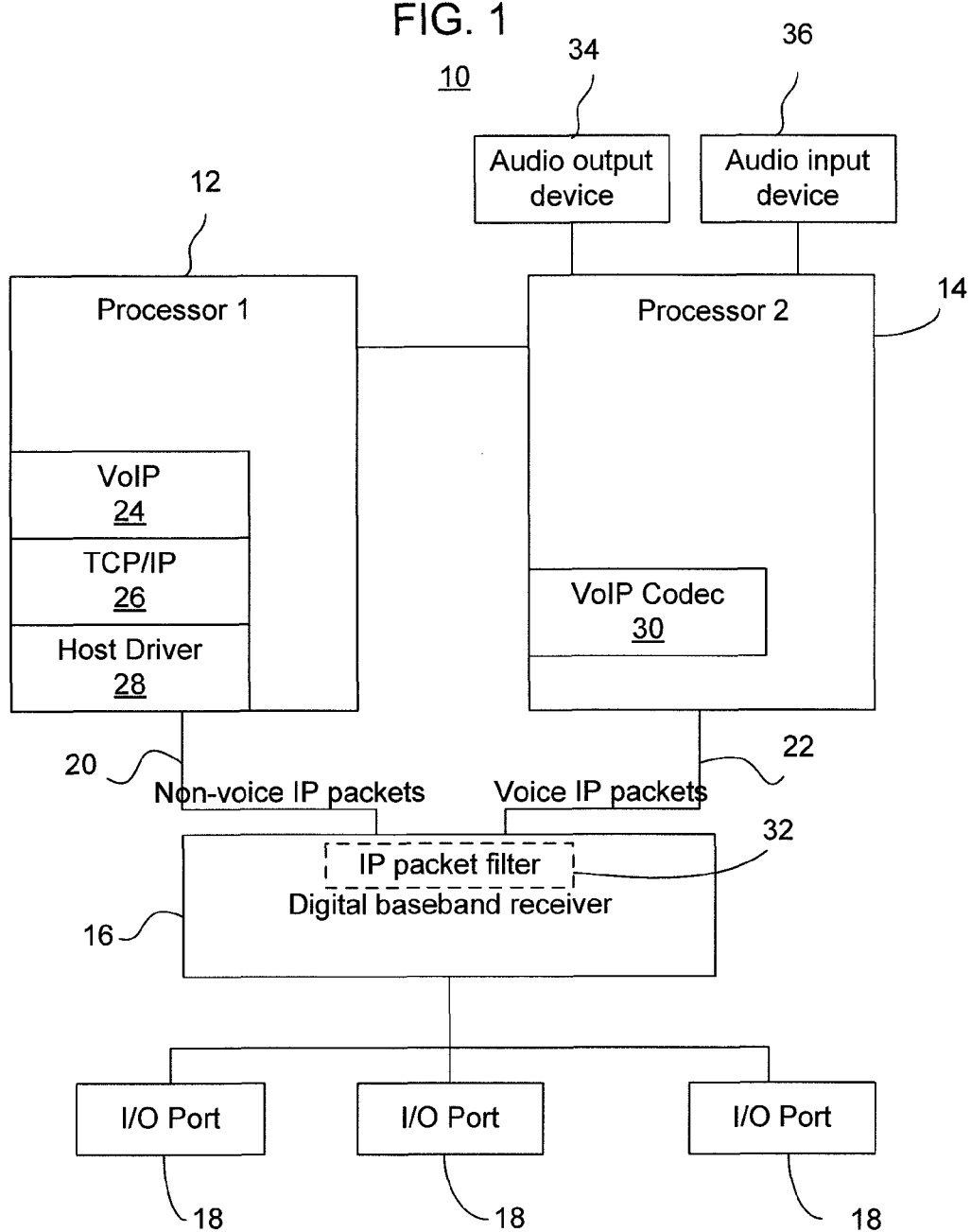
FIG. 1 illustrates a two-processor device in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiments of the present invention, devices having a first and a second processor are provided that may process non-voice IP packets using the first processor, and process voice IP packets using the second processor. In some embodiments, the first processor may be a relatively high power processor such as an application processor for, in addition to processing non-voice IP packets, running various applications. In contrast, the second processor may be a relatively lower power processor (e.g. when compared to the first processor) such as an audio processor that may be dedicated for processing voice IP packets. The devices may further include a digital baseband receiver that is coupled to both the first and the second processors. The digital baseband receiver may be designed to receive (as well as transmit) IP packets, and may be designed or configured to separate voice IP packets from non-voice packets, and to route the non-voice and voice IP packets to the first and the second processor, respectively.

In particular, the digital baseband receiver may determine which of the received IP packets are voice IP packets and which are non-voice IP packets. Upon determining which of the received IP packets are non-voice IP packets, the digital baseband receiver may then route the IP packets determined to be non-voice IP packets to the first processor for processing. Further, for those IP packets that are determined to be voice IP packets, the digital baseband receiver may route the IP packets determined to be voice IP packets to the second processor for processing. By employing a second lower power processor for processing the voice IP packets, the duty cycle of the first processor may be reduced while improving overall power efficiency of the device. These and other aspects of various embodiments of the present will be described in greater detail below.

FIG. 1 illustrates a two-processor device (herein "device") for processing voice and non-voice IP packets in accordance with various embodiments of the present invention. The device 10 includes a first processor 12, a second processor 14, a digital baseband receiver 16, multiple input/output (I/O) ports 18, an audio output device 34, and an audio input device 36 coupled together as shown. The device 10 may be a computing device designed to communicate through an IP-based network that may comprise of one or more wired and/or wireless IP-based networks. In some embodiments of the present invention, the digital baseband receiver 16 may be coupled to the first processor 12 via a higher speed signal path 20 and coupled to the second processor 14 via a relatively lower speed signal path 22 (when compared to signal path 20). Although not depicted, the device 10 may further include additional components such as additional processors, volatile and non-volatile memory devices, input devices (e.g., keyboard and/or mouse), display monitor, antenna, battery, and so forth.

In various embodiments of the present invention, the first processor 12 may be a relatively high-power application processor (i.e., higher power processor) that may process non-voice IP packets and may be programmed to execute various applications including, among other things, a host driver application 28, a Transmission Control Protocol/Internet Protocol (TCP/IP) application 26, and a VoIP application 24. Note that although not depicted, a copy of the instructions for the host driver application 28, the TCP/IP application 26, and the VoIP application may actually be stored in a physical storage medium. In contrast to the first processor 12, the second processor 14 may be a relatively low-power audio processor (i.e., a lower power processor as compared to processor 12), that may be dedicated for processing voice IP packets. In some embodiments, the second processor 14 may be programmed to execute applications for processing voice IP packets such as encoder/decoder (codec) application 30. The term "power" as used herein in reference to the processors 12 and 14 may refer to the processing speed and/or power consumption rate of the processors 12 and 14 as well as any associated resources (e.g., DRAM, bus structures, and so forth) required to operate these resources.

The digital baseband receiver 16 may be a digital baseband receiver for communicating via a wired and/or wireless IP-based network. For example, in some embodiments, the digital baseband receiver 16 may be designed to be a world interoperability for microwave access (WiMAX) digital baseband receiver, a wireless fidelity (WiFi) digital baseband receiver, and/or ultra-wideband (UWB) digital baseband receiver. The audio output device 34 may be a speaker while the audio input device 36 may be a microphone. In some embodiments, the audio output device 34 and the audio input device 36 may be embodied in a single device such as a headset.

Operationally, the device 10 may transmit and receive IP packets through I/O ports 18. The IP packets to be transmitted and received may include source Internet Protocol (IP) and medium access control (MAC) addresses. In some embodiments, the voice IP packets to be transmitted and received may be real time protocol (RTP) packets. Although three I/O ports 18 are depicted in FIG. 1, in alternative embodiments, fewer or greater number of I/O ports may be included in the device 10.

The digital baseband receiver 16 may concurrently receive both non-voice and voice IP packets through the I/O ports 18. In order to properly route the non-voice and the voice IP packets to the first and the second processor 12 and 14, respectively, the digital baseband receiver 16 may determine which of the IP packets received through the I/O ports 18 are voice IP packets and which are non-voice IP packets. After determining which of the IP packets received through the I/O ports 18 are voice IP packets, the digital baseband receiver 16 may then route the voice IP packets to the second processor 14 while routing the non-voice IP packets to the first processor 12.

The routing of the non-voice IP packets and the voice IP packets to the first and the second processor 12 and 14 respectively may be accomplished by provisioning the digital baseband receiver 16 with an IP packet filter 32. In some embodiments, the IP packet filter 32 may be created in the digital baseband receiver 16 by the first processor 12. In particular, the first processor 12 running or executing the VoIP application 24 may create an IP packet filter via the host driver application 28 to establish the IP packet filter 32 in the digital baseband receiver 16. The created IP packet filter 32 may facilitate the digital baseband receiver 16 to determine which of the IP packets received through the I/O ports 18 are non-voice IP packets and which are voice IP packets. The determination of whether an IP packet is a voice IP packet may be based on the source IP and MAC address of the IP packet, the packet type of the IP packet (e.g., if an IP packet is a voice IP packet then it may be an user datagram protocol (UDP) packet), and/or the logical port number that may be included in the IP address of the IP packet. After determining that an IP packet is a voice IP packet, the digital baseband receiver 16 may route that IP packet to the second processor 14, or alternatively, if the IP packet is determined to be a non-voice IP packet, route that IP packet to the first processor 12.

After routing the voice IP packets determined to be voice IP packets to the second processor 14, the second processor 14 may then process the voice IP packets by decoding the voice IP packets. The output of the second processor 14 may then be provided to the audio output device 34. Note that although not depicted, the output of the second processor 14 may be routed through additional hardware components such as a coder/decoder (codec) device before being outputted to the audio output device 34. Similarly, data input (i.e., audio signals) from the audio input device 36 may be routed through these additional components before being provided to the second processor 14 during a call session.

During a call session, the second processor 14, in addition to decoding incoming voice IP packets, may encode data received from the audio input device 36 and encapsulate the data into voice IP packets, which may be in the form of RTP packets. After encapsulating the data into the voice IP packets, the voice IP packets may then be transmitted to the digital baseband receiver 16 via the lower speed path 22.

Figure 2:
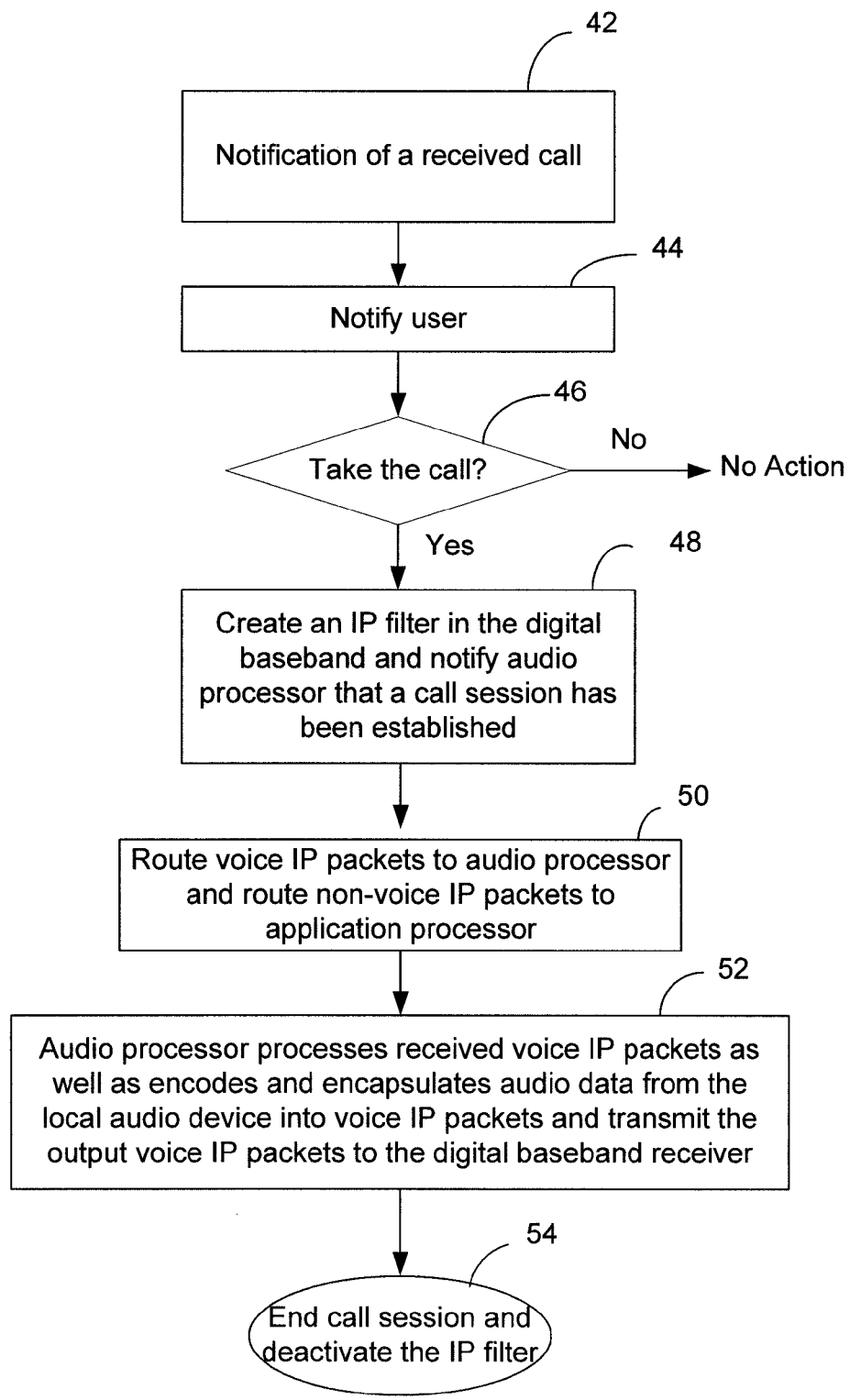
FIG. 2 illustrates a process for processing voice IP packets in accordance with various embodiment of the present invention.

FIG. 2 illustrates a process for processing voice IP packets in a two-processor device during a call session in accordance with various embodiments of the present invention. For the embodiments, the process 40 may be implemented using the device 10 of FIG. 1. Further, in some embodiments, the process 40 may be, at least in part, implemented by a VoIP application 24 being executed on a first processor 12 (i.e., application processor). The process 40 may begin when a call is received and the notification of the event is received by the VoIP application 24 (running on the first processor 12) via, for example, a standard IP packet at 42.

After receiving the notification, the VoIP application 24 may notify the user of the call at 44. The VoIP application 24 running on the first processor 12 may then wait for the user's indication as to whether the call will be taken at 46. If the user does not take the call, no action may be taken. On the other hand, if the user decides to take the call, then the VoIP application may create an IP packet filter 32 in the digital baseband receiver 16 and notify a second processor 14 (i.e., audio processor) that a call session has been established and to begin processing voice IP packets received from the digital baseband receiver 16 as well as to encode and encapsulate audio data coming from the audio input device 36 into voice IP packets, and to transmit the voice IP packets containing the encapsulated data to the digital baseband receiver 16 at 48.

Once the IP packet filter 32 has been created in the digital baseband receiver 16, the IP packet filter 32 may then filter out and route voice IP packets received from the I/O ports 18 to the audio processor (i.e., second processor 14) while routing non-voice IP packets to the application processor (i.e., first processor 12) at 50. The second processor 14 may then process (e.g., decode) the received voice IP packets as well as encode and encapsulate audio data received from the local audio input device 36 into voice IP packets and transmit the outputted voice IP packets to the digital baseband receiver 16 at 52. Concurrently, the first processor 12 may process non-voice IP packets received from the digital baseband receiver 16. Note that once the IP packet filter has been created, the VoIP application 24 as well as the first processor 12 (as a result of running the VoIP application) may not participate in the process of routing and processing of the voice IP packets to be received and transmitted through the second processor 14. Upon the call session ending, the VoIP application 24 via the first processor 12 may deactivate the IP packet filter 32 at 54.

Figure 3:
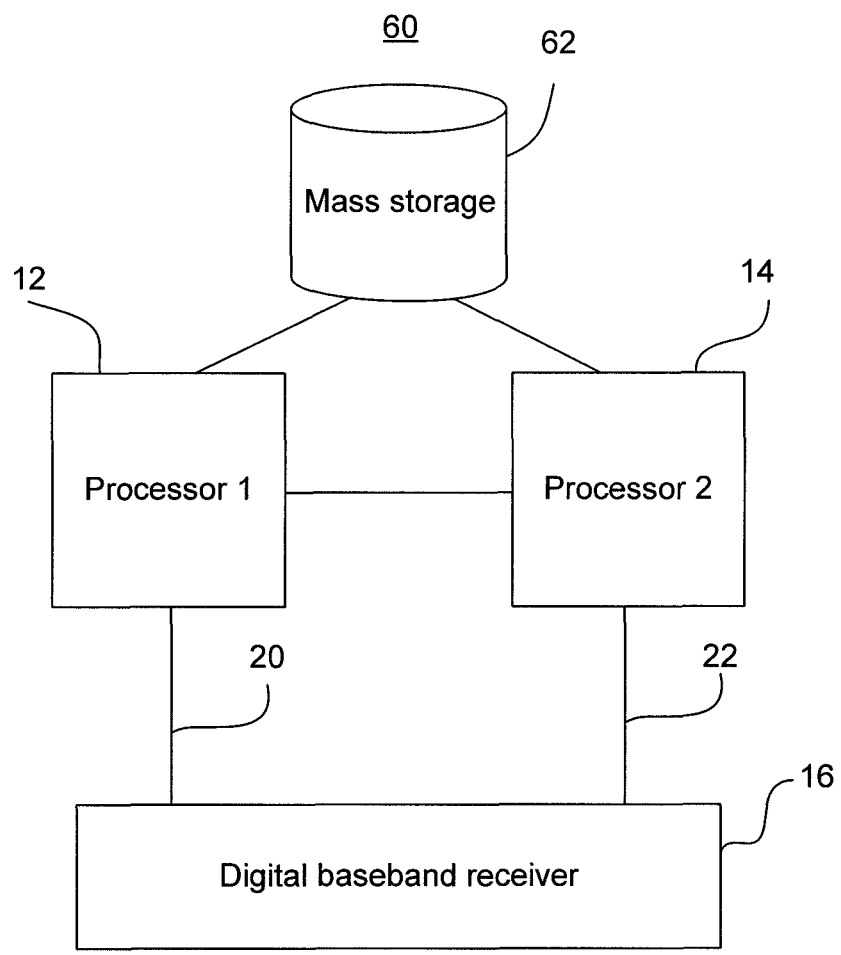
FIG. 3 illustrates a system suitable for practicing the present invention, in accordance with various embodiments.

FIG. 3 illustrates a system in accordance with various embodiments of the present invention. The system 60 includes a first processor 12, a second processor 14, a digital baseband receiver 16, and a mass storage device 62, coupled together as shown. Note that in alternative embodiments, the mass storage device 62 may not be coupled to the second processor 14. Instead a local storage, which may be a relatively low power local storage, may be coupled to the second processor 14. In some embodiments, the first processor 12 may be coupled to the digital baseband receiver 16 via a higher speed signal path 20 while the second processor 14 may be coupled to the digital baseband receiver 16 via a lower speed signal path 22. The digital baseband receiver 16 may be designed to receive as well as transmit IP packets via an IP-based network. In various embodiments, the first processor 12 may be advantageously programmed to create an IP packet filter in the digital baseband receiver 16 as previously described. In turn, the digital baseband receiver 16 may determine whether IP packets it receives are voice or non-voice IP packets, and to route the non-voice and voice IP packets to the first and the second processors 12 and 14, respectively, as previously described. In some embodiments, the digital baseband receiver 16 may be a WiMAX digital baseband receiver, a WiFi digital baseband receiver, a UWB digital baseband, and/or Ethernet digital baseband receiver.

The mass storage device 62 may be designed to store data as well as various applications. For example, in some embodiments, the mass storage device 62 may store a VoIP application, a TCP/IP application, and a host driver application, to be executed by the first processor 12. The VoIP application stored in the mass storage device 62 may include instructions to program the first processor 12 to perform the various operations as earlier described. The mass storage device 62 may further store a codec application to be executed by the second processor 14. Alternatively, the codec application may be stored in a local storage (not depicted) that may be coupled to the second processor 14.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
creating, by a first processor coupled with a second processor of a computing system, at a digital baseband receiver coupled with the first and second processors of the computing system, in response to a request from a voice over Internet Protocol (VOIP) application operated by the first processor, an IP packet filter, wherein the request is provided by the VOIP application in response to a first indication to the VOIP application that a call session is initiated;
notifying, by the first processor, the second processor that the call session is initiated, to process voice IP packets to be received from the digital baseband receiver;
receiving, at the digital baseband receiver, a plurality of IP packets;
determining, by the IP packet filter, whether received IP packets include voice or non-voice IP packets;
routing, by the IP packet filter, received non-voice IP packets to the first processor to process; and
routing by the IP packet filter received voice IP packets to the second processor to process on behalf of the VOIP application executing on the first processor, concurrently with the first processor processing the non-voice IP packets, wherein the first and second processors are different processors; and
deactivating, by the first processor, the IP packet filter in response to a second indication to the VOIP application that the call session is terminated.

2. The method of claim 1, wherein routing received voice IP packets to the second processor comprises routing received voice IP packets to the second processor to decode the voice IP packets.

3. The method of claim 1, wherein received IP packets comprise source Internet Protocol (IP) and medium access control (MAC) addresses, and determining comprises at least determining whether received IP packets include voice or non-voice IP packets based at least on the source IP and MAC addresses of the received IP packets.

4. The method of claim 1, wherein determining comprises determining whether received IP packets include voice or non-voice IP packets based at least in part on packet type of the received IP packets.

5. The method of claim 1, wherein determining comprises determining whether received IP packets include voice or non-voice IP packets based at least in part on logical port numbers included in IP addresses of the received IP packets.

6. One or more physical non-transitory storage medium; and
a plurality of executable instructions stored in the physical non-transitory storage medium, designed to program a first processor coupled with a second processor of a device with a voice over Internet Protocol (VOIP) application, wherein the VOIP application, in response to execution by the first processor, is to:
receive a first notification of a telephone call;
provide a second notification of the received telephone call to a user; and
in response to an indication from the user that the telephone call is accepted,
notify the second processor that the telephone call is initiated;
create an IP packet filter in a digital baseband receiver of the device to separate received voice and non-voice IP packets from each other for the VOIP application, and on separation, route non-voice IP packets to the first processor for processing, and voice IP packets to the second processor for processing concurrently with the first processor for the VOIP application; and
deactivate the IP packet filter in response to a third notification that the telephone call is terminated.

7. The physical non-transitory storage medium of claim 6, wherein the VOIP application is further enabled to notify the second processor to indicate that a call session is established and to process said voice IP packets upon the second processor receiving said voice IP packets.

8. An apparatus, comprising:
- a first processor dedicated to process non-voice Internet Protocol (IP) packets;
- a second processor coupled with the first processor and dedicated to process voice IP packets; and
- a digital baseband receiver coupled to the first processor to receive IP packets, and to create an IP packet filter by a voice over IP (VOIP) application operated by the first processor to determine whether received IP packets include voice or non-voice IP packets, and route voice IP packets to the second processor to process on behalf of the VOIP application operated by the first processor, and non-voice IP packets to the first processor to process concurrently with the second processor processing voice IP packets, wherein the IP packet filter is created in response to a notification from a user to begin a call session associated with the voice IP packets, the notification being received by the VOIP application, and wherein the IP packet filter is deactivated by the first processor when the call session ends, wherein the first processor is to notify the second processor that the call session is initiated, to process the voice IP packets to be received from the digital baseband receiver.

9. The apparatus of claim 8, wherein the second processor is adapted to decode the voice IP packets.

10. The apparatus of claim 8, further comprising an audio input device coupled to the second processor, and the second processor is adapted to encapsulate data received from the audio input device into voice IP packets and transmit the voice IP packets containing the encapsulated data to the digital baseband receiver.

11. The apparatus of claim 10, wherein the second processor is further adapted to encode the data received from the audio input device prior to encapsulating said data into voice IP packets.

12. The apparatus of claim 8, wherein said IP packets comprise source Internet Protocol (IP) and medium access control (MAC) addresses and said IP packet filer is adapted to determine whether IP packets received by the digital baseband receiver include voice or non-voice IP packets based at least on the source IP and MAC addresses of the received IP packets.

13. The apparatus of claim 8, wherein said IP packet filer is adapted to determine whether IP packets received by the digital baseband receiver include voice or non-voice IP packets based at least in part on packet type of the received IP packets.

14. The apparatus of claim 8, wherein said IP packet filter is adapted to determine whether IP packets received by the digital baseband receiver include voice or non-voice IP packets based at least in part on logical port numbers included in IP addresses of the IP packets.

15. A system, comprising:
- a mass storage device to store data;
- a first processor coupled to the mass storage device to operate a voice over Internet Protocol (VOIP) application, and to process non-voice IP packets;
- a second processor coupled to the first processor to process voice IP packets on behalf of the VOIP application; and
- a digital baseband receiver coupled to the first and second processors to receive IP packets, and to create an IP packet filter by the first processor on behalf of the VOIP application to determine whether received IP packets include voice or non-voice IP packets, and route received non-voice and voice IP packets to the first and second processors for processing, respectively, wherein the IP packet filter is created in response to a request of the VOIP application, the request provided in response to a notification from a user to begin a call session associated with the voice IP packets, wherein the IP packet filter is deactivated by the first processor on behalf of the VOIP application when the call session ends, wherein the first processor is to notify the second processor that the call session is initiated, to process the voice IP packets to be received from the digital baseband receiver.

16. The system of claim 15, wherein said digital baseband receiver comprises a world interoperability for microwave access (WiMAX) digital baseband receiver, wireless fidelity (WiFi) digital baseband receiver, ultra-wideband (UWB) digital baseband, or Ethernet digital baseband receiver.

17. The system of claim 15, wherein said first processor is coupled to the digital baseband receiver via a first signal path and the second processor is coupled to the digital baseband receiver via a second signal path having a signal speed lower than a signal speed of the first signal path.

* * * * *